No. 828,466. PATENTED AUG. 14, 1906.
J. A. DORAN.
THREADING MACHINE.
APPLICATION FILED OCT. 2, 1905.

2 SHEETS—SHEET 1.

WITNESSES
E. H. Bond
M. A. Bond.

INVENTOR
James A. Doran
by H. E. Bellows
ATTORNEY

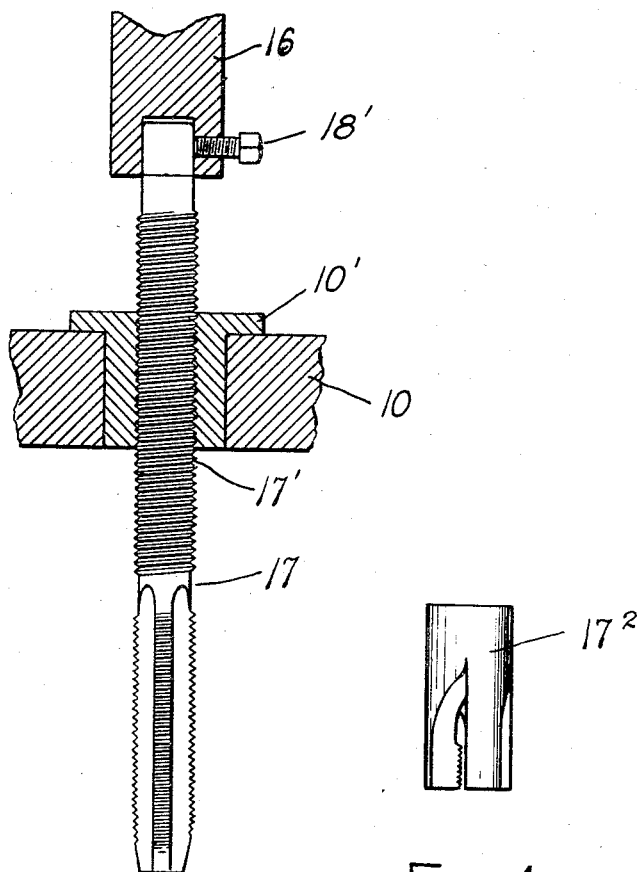

UNITED STATES PATENT OFFICE.

JAMES A. DORAN, OF PROVIDENCE, RHODE ISLAND.

THREADING-MACHINE.

No. 828,466.     Specification of Letters Patent.     Patented Aug. 14, 1906.

Application filed October 2, 1905. Serial No. 280,895.

*To all whom it may concern:*

Be it known that I, JAMES A. DORAN, a citizen of the United States, residing at Providence, in the county of Providence and State of Rhode Island, have invented certain new and useful Improvements in Threading-Machines, of which the following is a specification, reference being had therein to the accompanying drawings.

My invention relates to automatic threading-machines; and the novelty resides in the peculiar construction and arrangement of parts, all as more fully hereinafter described, and then particularly pointed out in the appended claims, and as illustrated in the accompanying drawings, wherein—

Figure 1:
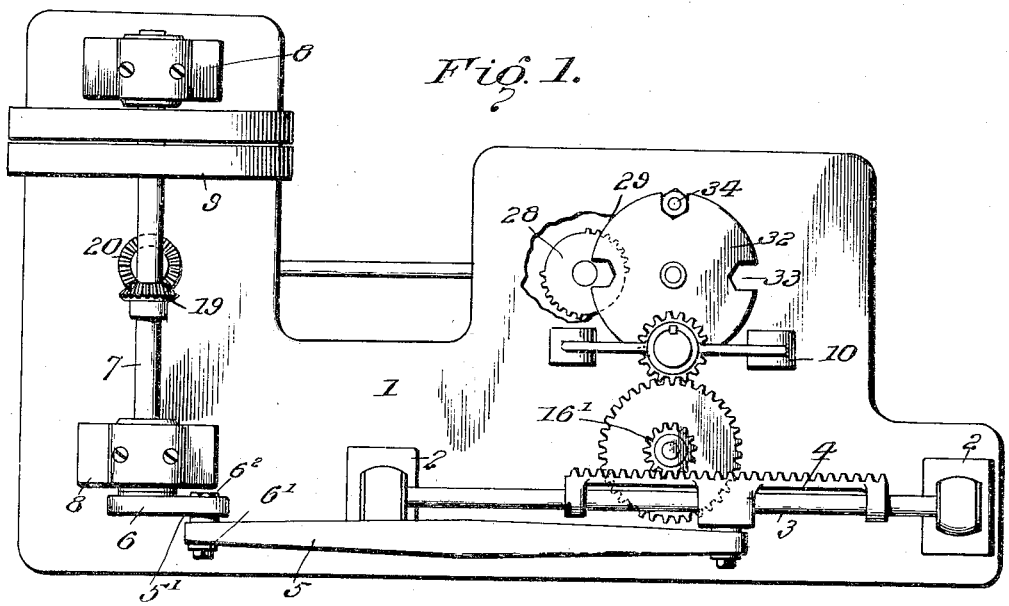
Figure 2:
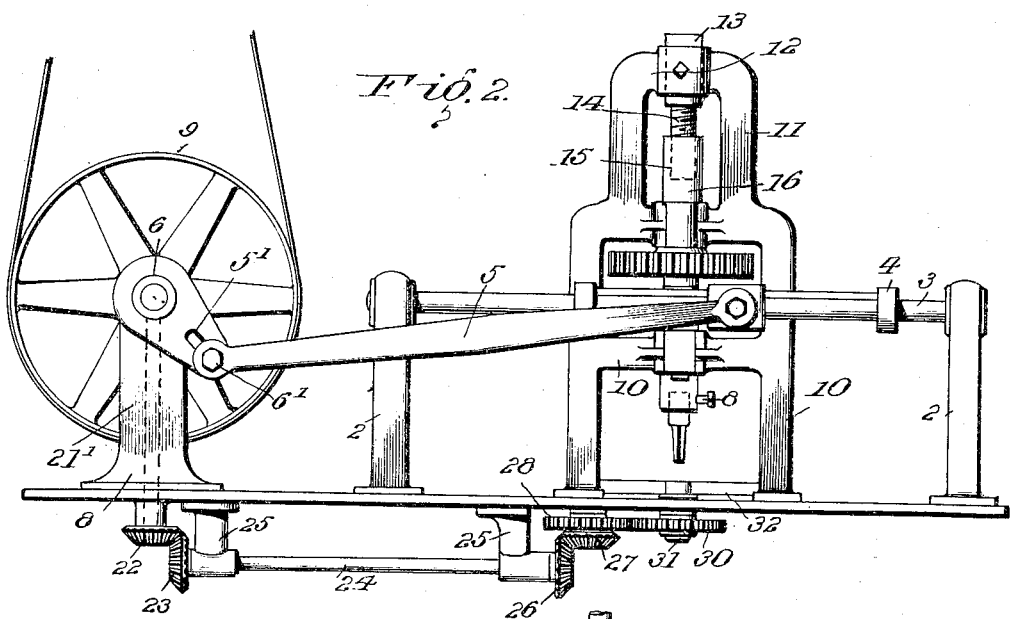
Figure 5:
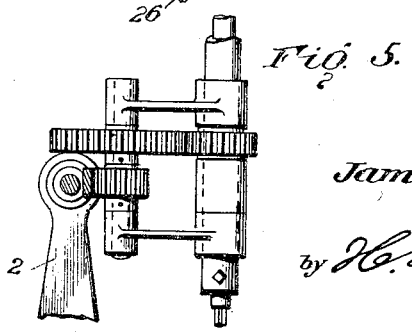

Figure 1 is a plan view of a machine embodying my invention, showing a portion of the base broken away and omitting certain of the parts; Fig. 2, a front elevation of the same; Fig. 3, a modified form of my invention, and Fig. 4 a side elevation of a threading tool or die. Fig. 5 is a detail in top plan.

Like reference-numerals indicate like parts throughout the views.

My machine comprises a base 1, upon which are standards 2, supporting guide-bar 3 upon which is mounted a rack 4. A connecting-rod 5 joins the rack with a crank-pin 6', adjustably mounted in a slot 5' in a crank 6, mounted upon the driving-shaft 7, supported in standards 8 and driven by a pulley 9 on the driving-shaft. The crank-pin is provided with a nut 6² to hold the connecting-rod in adjusted position, whereby the throw of the rack 4 may be regulated.

Upon the base 1 is a frame 10, with an arched portion 11, in which is adjustably mounted, by means of a binding-screw 12, a shank or block 13, carrying upon its lower end a screw 14, which loosely engages a threaded recess 15 in the upper end of a vertical bar or holder 16. The bar 16 slides in the frame 10 and has its lower extremity recessed to receive the shank of the tap, die, or other threading-tool 17, which is retained therein by means of a binding-screw 18. A toothed wheel 16' is slidably keyed upon the shaft 16 intermediate its length and engages the teeth of the rack 4, and a multiplying-gearing is interposed between said toothed wheel and the spindle. The threads upon screw 14 and the threading-tool are of the same pitch.

A convenient form of feeding mechanism is employed as follows: A bevel-gear 19 upon the driving-shaft 7 meshes with a gear 20 upon the upper end of a shaft 21, mounted in a boss 21' on the base of the machine. A bevel-gear 22 upon the lower end of shaft 21 engages a gear 23 upon one end of a shaft 24, mounted in brackets 25 below the base 1. Upon the opposite end of shaft 24 is a bevel-gear 26, which meshes with a bevel-gear 27, attached to the lower face of a mutilated gear 28, whose teeth 29 engage a full gear 30, mounted upon a shaft 31, which traverses the machine-base 1. Fixed to the upper end of shaft 31 is a feeding-disk 32, provided at intervals along the margin of its upper face with seats 33 to receive the articles 34 intended to be fed to the threading-tool 17.

The operation of my machine is as follows: Power is applied to the shaft 7 through pulley 9 and transmitted, through crank 6 and connecting-rod 5, to the rack 4, which in its reciprocation rotates, through the toothed wheel 16', the bar 16, thereby forcing the threading-tool 17 into engagement with the article to be operated upon. The operation of the feeding mechanism is as follows: The driving-shaft 7 drives the mutilated gear 28 through gear connections 19, 20, 22, 23, 26, and 27. The teeth 29 upon this gear engaging the gear 30 intermittently advance the disk 32 a quarter-turn, whereby the articles 34 are successively presented to the action of the threading-tool 17. During the intervals of rotation of the disk 32 and while the threading-tool is operating the articles are successively removed from and inserted in the seats 33.

It is obvious that equivalent results may be obtained by the modified form of my machine shown in Fig. 3, wherein the threading-tool 17 has an extended shank provided with threads 17' and fixed at its upper end by a screw 18 to the bar 16, which may be reciprocated, as hereinbefore described. The threaded shank 17' engages a bushing 10' in the frame 10. This bushing is removable to permit the substitution of bushings adapted to various sizes of threading-tools.

It will be noted that the binding-screw 12 permits the vertical adjustment of the theading-tool in relation to the article operated upon, also that by adjustment of crank-pin 6' the extent of vertical travel of the threading-tool is regulated.

In Fig. 4 is shown the form of tool or die 17² employed in exterior threading, while the tap 17 is employed in interior cutting.

I make no claim to the multiplying-gearing between the rack and the spindle.

Having described my invention, what I claim is—

1. In a threading-machine, the combination with a frame, of a vertically-disposed bar mounted therein, a threading-tool mounted in the lower end of said bar, a vertically-disposed screw mounted in the frame above said bar and loosely engaged in a recess in the upper end thereof, a rack, means for actuating said rack and a gear slidably keyed upon said bar and connected with said rack for rotating the bar, and a work-holder.

2. In a threading-machine, the combination of a frame, a supporting-bar mounted thereon, and a rack movable on said bar, of a frame with arched portion rising from said frame, a block adjustably mounted in the arched frame, a screw carried by the lower end of said block, a vertically-disposed bar having a recess loosely receiving the lower end of said screw, and slidingly mounted in said arched frame, a threading-tool carried by the lower end of said bar, means slidably keyed upon said bar and connected with said rack for rotating said bar, and a workholder.

3. In a threading-machine, the combination of a frame, a base, a threading-tool mounted above said base, a driving-shaft and connections above said base for actuating said threading-tool, a feeding-disk above said base, and means beneath said base for actuating said disk, and connections between said means and said driving-shaft, as and for the purpose specified.

In testimony whereof I have affixed my signature in presence of two witnesses.

JAMES A. DORAN.

Witnesses:
HORATIO E. BELLOWS,
JOSEPH A. BENOIT.